R. A. Daniels,
Hame Fastener,
Nº 34,351.          Patented Feb. 11, 1862.
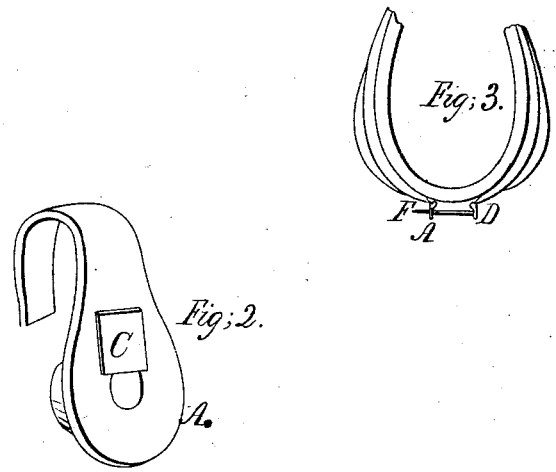
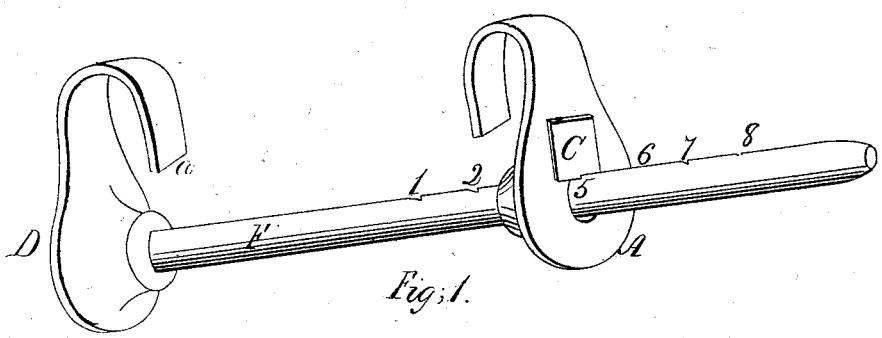
Witnesses.
Geo. F. Brown
[signature]
Inventor.
R A Daniels.

UNITED STATES PATENT OFFICE.

R. A. DANIELS, OF WAYNE, OHIO.

IMPROVEMENT IN FASTENERS FOR HAMES.

Specification forming part of Letters Patent No. 34,351, dated February 11, 1862.

*To all whom it may concern:*

Be it known that I, R. A. DANIELS, of Wayne, county of Ashtabula, and State of Ohio, have invented a new and Improved Mode of Fastening Hames to the Collar; and I do hereby declare that the following is a full and general description thereof, reference being had to the accompanying drawings, and to the letters of reference marked thereon, in which—

Figure 1 is a perspective view of my invention. Fig. 2 is a perspective view of the hook A. Fig. 3 is a perspective view, on a reduced scale, of a pair of hames secured to a collar by my invention.

The nature of my invention consists in a novel arrangement for effecting a simple, convenient, and durable hame-fastener.

To enable others skilled in the art to make and use my invention, I will proceed to describe its construction and operation.

The several parts of my improved hame-fastener are composed or made, generally, of malleable or wrought iron, except the catch C, which should be of steel, although it may or could be swaged or made with the hook, whether wrought or malleable. The hook D is made fast to the bar F in any convenient manner.

A is a hook which slides freely on bar F. C is a catch, which is shown upon hook A. The bar F is provided with a series of notches, so that the fastener may be readily suited to different-sized collars. The hooks D and A are placed on the hame-rings, and the ends closed down, as shown at $i$, Fig. 3.

To secure the hames to the collar, the hook A is slipped on the bar F and pressed forward until the hames are closed to the collar. The lateral pressure that is given to the hooks by the spring of the slightly-compressed collar will cause the hooks to expand and lock the catch C in one of the several notches on bar F and hold the hames to the collar.

To release the hames from the collar, the top of hook A is pressed in toward hook D, so that the catch is free from the notch and the bar F is easily removed.

What I claim as my invention, and desire to have secured to me by Letters Patent of the United States, is—

The employment of the hook A and catch C, in combination with the notched bar F and hook D, as shown, for the purpose herein set forth and described.

R. A. DANIELS.

Witnesses:
GEO. F. BROWN,
JEFFERSON PALM.